(12) United States Patent
Matsumura et al.

(10) Patent No.: US 7,885,053 B2
(45) Date of Patent: Feb. 8, 2011

(54) ELECTRIC DOUBLE LAYER CAPACITOR AND METHOD FOR MANUFACTURING SAME

(75) Inventors: Nao Matsumura, Osaka (JP); Motohiro Sakata, Osaka (JP); Hideki Shimamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 307 days.

(21) Appl. No.: 12/300,919

(22) PCT Filed: May 24, 2007

(86) PCT No.: PCT/JP2007/060591

§ 371 (c)(1),
(2), (4) Date: Nov. 14, 2008

(87) PCT Pub. No.: WO2008/007500

PCT Pub. Date: Jan. 17, 2008

(65) Prior Publication Data

US 2009/0195964 A1    Aug. 6, 2009

(30) Foreign Application Priority Data

Jul. 14, 2006   (JP)   ............................ 2006-193826

(51) Int. Cl.
*H01G 9/00*   (2006.01)
(52) U.S. Cl. .................. 361/502; 361/503; 361/504; 361/509; 361/512; 361/523
(58) Field of Classification Search ................ 361/502, 361/503–504, 509–512, 523–525, 516–519, 361/528–529, 303–305
See application file for complete search history.

(56) References Cited

U.S. PATENT DOCUMENTS 6,614,646 B2 *   9/2003   Bogaki et al. ............... 361/502

(Continued)

FOREIGN PATENT DOCUMENTS

JP    10-172867 A    6/1998

(Continued)

OTHER PUBLICATIONS

South Korean Office action dated Oct. 20, 2010 for Appl. No. 10-2008-7028638.

(Continued)

*Primary Examiner*—Nguyen T Ha
(74) *Attorney, Agent, or Firm*—Pearne & Gordon LLP

(57) ABSTRACT

An electric double layer capacitor includes first and second collectors, first and second polarizable electrode layers provided on the first and second collectors, respectively, a separator having an insulating property provided between the first and second polarizable electrode layers, and an electrolytic solution impregnated in the separator and the first and second polarizable electrode layers. A lower electric potential is to be applied to the second collector than to the first collector. The electrolytic solution contains anion including fluorine as electrolyte. The separator includes a separation layer facing the second polarizable electrode layer, and an inhibition layer facing the first polarizable electrode layer. The separation layer contains cellulose. The inhibition layer is made of material different from that of the separation layer. The inhibition layer prevents cellulose from decomposing. This electric double layer capacitor prevents the separator from dissolving, having an excellent long-term reliability.

13 Claims, 2 Drawing Sheets

U.S. PATENT DOCUMENTS

| | | | |
|---|---|---|---|
| 6,697,249 B2 * | 2/2004 | Maletin et al. | 361/502 |
| 6,778,379 B2 * | 8/2004 | Iwaida et al. | 361/502 |
| 7,283,349 B2 * | 10/2007 | Yoshida et al. | 361/502 |
| 7,706,129 B2 * | 4/2010 | Hirose et al. | 361/502 |
| 2004/0070921 A1 * | 4/2004 | Ikeda et al. | 361/502 |

FOREIGN PATENT DOCUMENTS

| | | |
|---|---|---|
| JP | 10-256088 A | 9/1998 |
| JP | 2000-106327 A | 4/2000 |
| JP | 2003-272951 A | 9/2003 |
| JP | 2003-282376 A | 10/2003 |
| JP | 2004-087664 A | 3/2004 |
| WO | 2004-084246 A1 | 9/2004 |
| WO | 2005-090452 A1 | 9/2005 |

OTHER PUBLICATIONS

International Search Report issued Aug. 14, 2007 in the international (PCT) Application of which the present is the U.S. National Stage.

* cited by examiner

ELECTRIC DOUBLE LAYER CAPACITOR AND METHOD FOR MANUFACTURING SAME

TECHNICAL FIELD

The present invention relates to an electric double layer capacitor and a method of manufacturing the capacitor.

BACKGROUND OF THE INVENTION

Patent documents 1 and 2 and non-patent document 1 disclose conventional electric double layer capacitors. Each of the conventional electric double layer capacitor includes a capacitor element and electrolytic solution impregnated in the capacitor element. The capacitor element includes two electrode units and a separator provided between the two electrode units. Each of the electrode units includes a collector made of metal foil, such as aluminum foil, and a polarizable electrode layer made mainly of activated carbon provided on the collector. Respective polarizable electrode layers of the two electrode units face each other across the separator.

The separator has the electrolytic solution impregnated therein to hold the electrolytic solution, and prevents an anode and a cathode from short-circuiting with each other. The separator contains cellulose having many hydroxyl groups to increase its hydrophilic property. The cellulose provides the separator with a large strength, a large flexible, an elasticity, and a hygroscopic property.

The electrolytic solution contains halogen, such as fluorine, as electrolyte to prevent the solution from deteriorating due to electrolysis.

In the conventional electric double layer capacitors, the separator may dissolve and have its strength reduced, accordingly reducing insulation between the electrode units.

Patent Document 1: JP10-256088A
Patent Document 2: JP2000-106327A
Non-Patent Document 1: "Aluminum Electrolyte Capacitor with Liquid Electrolyte Cathode" by Izaya Nagata, Japan Capacitor Industrial Co., Ltd. Feb. 24, 1997, 1st impression, 2nd edition, p. 368 to 373.

SUMMARY OF THE INVENTION

An electric double layer capacitor includes first and second collectors, first and second polarizable electrode layers provided on the first and second collectors, respectively, a separator having an insulating property provided between the first and second polarizable electrode layers, and an electrolytic solution impregnated in the separator and the first and second polarizable electrode layers. A lower electric potential is to be applied to the second collector than to the first collector. The electrolytic solution contains anion including fluorine as electrolyte. The separator includes a separation layer facing the second polarizable electrode layer, and an inhibition layer facing the first polarizable electrode layer. The separation layer contains cellulose. The inhibition layer is made of material different from that of the separation layer. The inhibition layer prevents cellulose from decomposing. This electric double layer capacitor prevents the separator from dissolving, having an excellent long-term reliability.

REFERENCE NUMERALS

3A Collector (First Collector)
3B Collector (Second Collector)
4A Polarizable Electrode Layer (First Polarizable Electrode Layer)
4B Polarizable Electrode Layer (Second Polarizable Electrode Layer)
5 Separator
5A Inhibition Layer
5B Separation Layer
9 Electrolytic Solution

DETAILED DESCRIPTION OF THE PREFERRED EMBODIMENT

Figure 1:
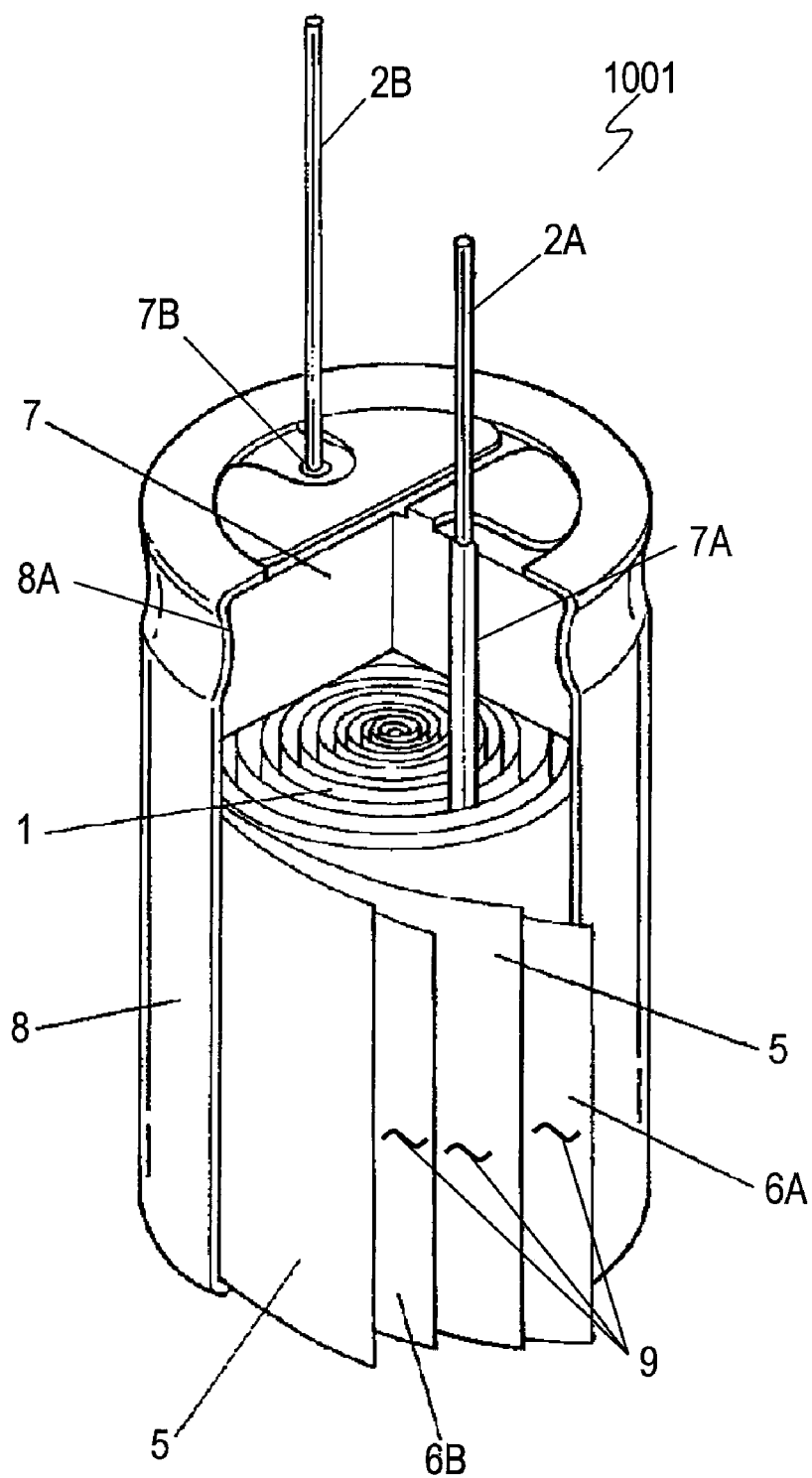
FIG. 1 is a partially cut-away perspective view of an electric double layer capacitor in accordance with an exemplary embodiment of the present invention.

FIG. 1 is a partially cut-away perspective view of electric double layer capacitor 1001 in accordance with an exemplary embodiment of the present invention. Electric double layer capacitor 1001 includes capacitor element 1, electrolytic solution 9 impregnated in capacitor element 1, positive terminal 2A and negative terminal 2B which are connected to capacitor element 1, case 8 to accommodate capacitor element 1, and sealing plug 7 made of rubber for sealing case 8. Sealing plug 7 has holes 7A and 7B through which leads 2A and 2B are inserted to expose to outside, respectively. Sealing plug 7 is fitted into opening 8A of case 8, and then opening 8 is shrunk to compress sealing plug 7 to seal opening 8A of case 8. Capacitor element 1 includes positive electrode unit 6A connected to positive lead 2A, negative electrode unit 6B connected to negative lead 2B, and separator 5 provided between positive electrode unit 6A and negative electrode unit 6B. Separator 5 has an insulating property to insulate positive electrode unit 6A from negative electrode unit 6B electrically. Capacitor element 1 is wound and is accommodated in case 8. Containing a small amount of water, electrolytic solution 9 contains a small amount of water, anion including fluorine as electrolyte.

Figure 2:
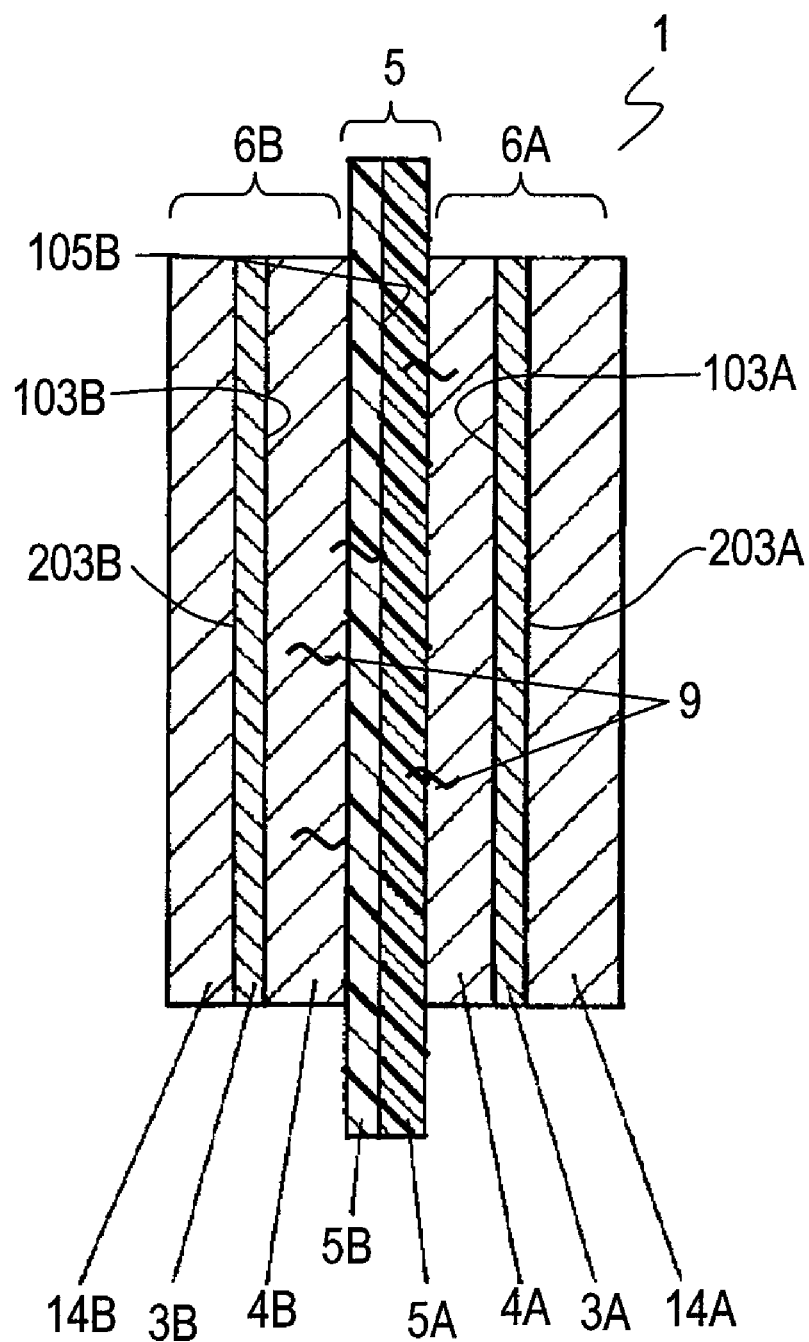
FIG. 2 is an enlarged sectional view of a capacitor element of the electric double layer capacitor in accordance with the embodiment.

FIG. 2 is an enlarged sectional view of capacitor element 1.

Positive electrode unit 6A includes collector 3A connected to positive lead 2A, polarizable electrode layer 4A provided on surface 103A of collector 3A, and polarizable electrode layer 14A provided on surface 203A of collector 3A opposite to surface 103A. Collector 3A is made of aluminum foil. Polarizable electrode layer 4A is made of electrode-activating material, conductive material, such as activated carbon, having a large surface area. Plarizable electrode layer 14A is made of electrode-activating material, conductive material, such as activating carbon, having a large surface area. Negative electrode unit 6B includes collector 3B connected to negative lead 2B, polarizable electrode layer 4B provided on surface 103B of collector 3B, and polarizable electrode layer 14B provided on surface 203B of collector 3B opposite to surface 103B. Collector 3B is made of aluminum foil. Polarizable electrode layer 4B is made composed of electrode-activating material, conductive material, such as activated carbon, having a large surface area. Polarizable electrode layer 14B is made of electrode-activating material, conductive material, such as activated carbon, having a large surface area. Surface 103A of collector 3A is directed towards surface 103B of collector 3B. Separator 5 is provided between polarizable electrode layers 4A and 4B of electrode units 6A and 6B. A higher electric potential is arranged to be applied to positive electrode unit 6A than to negative electrode unit 6B, and a higher electric potential is arranged to be applied to collector 3A than to collector 3B. That is, a lower electric potential is arranged to be applied to collector 3B than to collector 3A.

Separator 5 includes separation layer 5B facing and contacting negative electrode unit 6B (polarizable electrode layer 4B), and inhibition layer 5A provided on surface 105B facing positive electrode unit 6A of separation layer 5B. Inhibition layer 5A faces and contacts positive electrode unit 6A (polarizable electrode layer 4A). Separation layer 5B contains cellulose. Inhibition layer 5A is made of porous film or unwoven fabric made of material different from material of separation layer 5B. The material of the porous film and the unwoven cloth may be one of olefin-based polymer, such as polypropylene, fluorine-based polymer, aramid resin, and polyester-based polymer.

A cause was confirmed, in conventional electric double layer capacitors, why cellulose maintaining the strength of a separator decomposed. Cellulose is white fibrous material which does not dissolve in solvent, such as water, alcohol, or ether. Particularly if reactant produced during charging and discharging diffuses slowly near an electrode unit to be a positive electrode unit, anion contained in electrolytic solution reacts with water, accordingly causing the electrolytic solution to exhibit strong acidity. Cellulose decomposes in acid. The strong acidity of the electrolytic solution reduces the strength of cellulose significantly, thus drastically reducing the strength of the separator.

In electric double layer capacitor 1001 in accordance with the embodiment, even if electrolytic solution 9 exhibits strong acidity near positive electrode unit 6A due to fluorine in anion, inhibition layer 5A prevents cellulose of separation layer 5B from decomposing. This maintains the strength of separator 5, thus providing electric double layer capacitor 1001 with a high reliability. Inhibition layer 5A facing positive electrode unit 6A is made of one of olefin-based polymer, fluorine-based polymer, aramid resin, and polyester-based polymer to provide separator 5 with a high resistance to acid and solvent.

The olefin-based polymer for inhibition layer 5A may employ polyethylene, polypropylene, and polybutene. The fluorine-based polymer may employ polytetrafluoroethylene (PTFE), perfluoroalkoxyalkane (PFA), perfluoroethylenepropencopolymer (PFEP), ethylenetetrafluoroethylene-copolymer (ETFE), and polyvinylidenefluoride (PVDF). The polyester-based polymer may employ polyethylene-terephthalate (PET), polytrimethylene-terephthalate, polybutylene-terephthalate, polyethylene-naphthalate, and polybutylene-naphthalate.

Separation layer 5B is a sheet containing a large amount of cellulose, such as porous film, paper, or unwoven cloth. This sheet has high liquid-absorbing and liquid-holding properties for electrolytic solution 9 impregnating therein, that is, maintains a large amount of electrolytic solution 9 therein for a long time. Thus, separation layer 5B may be preferably made of paper of cellulose fiber.

According to the embodiment, separator 5 includes separation layer 5B and inhibition layer 5A having a sheet shape. Inhibition layer 5A and separation layer 5B may be bonded with an adhesive to provide separator 5. Separator 5 may be formed by just placing inhibition layer 5A having a sheet shape on separation layer 5B having a sheet shape. Inhibition layer 5A may include plural layers.

One of inhibition layer 5A and separation layer 5B may be applied onto the other of inhibition layer 5A and separation layer 5B to provide separator 5 including inhibition layer 5A and separation layer 5B which are unitarily integrated. For instance, material of inhibition layer 5A may be applied onto separation layer 5B made of cellulose to form separator 5. Alternatively, solution containing cellulose dispersed therein may be applied onto inhibition layer 5A having a sheet shape and dried by a so-called paper-making process to provide thin separator 5, accordingly providing capacitor 1001 with a small size. In the paper-making process, the solution is applied onto inhibition layer 5A and dried, and then, the solution may be applied onto the dried solution to provide separation layer 5B made of multiple-layer paper, such as double-layer or triple-layer paper.

Collectors 3A and 3B may be connected leads 2A and 2B, respectively, from the outside of capacitor 1001 according to the embodiment. Instead of leads 2A and 2B, connection terminals may be provided on end surfaces of the collectors. Current collectors 3A and 3B may be connected from the outside of capacitor 1001 via the terminals.

Polarizable electrode layers 4A and 4B of electrode units 6A and 6B are made of activated carbon. Polarizable electrode layer 4B of negative electrode unit 6B may be carbon or carbon compound, providing the same effects.

Samples of electric double layer capacitor 1001 were manufactured.

Example 1

In a sample of example 1, polarizable electrode layers 4A and 4B contained 80 wt % of activated carbon, 10 wt % of binder, and 10 wt % of conductive auxiliary substance, and collectors 3A and 3B were made of etched aluminum foil. The materials of polarizable electrode layers 4A and 4B were dispersed in water, and applied on the aluminum foil for collectors 3A and 3B with a comma-coater to provide electrode units 6A and 6B.

Inhibition layer 6A of separator 5 was made of a sheet of poly-vinylidenefluoride. Separation layer 5B was made of paper of cellulose. Inhibition layer 5A was placed on separation layer 5B to provide separator 5. Separator 5 was arranged between electrode units 6A and 6B, such that inhibition layer 6A was directed towards positive electrode unit 6A, and separation layer 5B was directed towards negative electrode unit 6B, as shown in FIG. 2. Then, separator 5 and electrode units 6A and 6B were wound to manufacture capacitor element 1

Electrolytic solution 9 contained propylene-carbonate as solvent and 1 mol/liter of tetraethylammonium-tetrafluoroborate as electrolytic dissolved in the solvent. It was confirmed that the content of water in electrolytic solution 9 was less than 100 ppm.

Capacitor element 1 was accommodated in case 8 made of aluminum, and was impregnated with electrolytic solution 9 in vacuum. Then, sealing plug 7 was inserted in opening 8A of case 8 under atmospheric pressure, and was compressed together with case 8 to manufacture the sample of example 1 of electric double layer capacitor 1001.

Just after the sample of example 1 of electric double layer capacitor 1001 was manufactured, a capacitance and an internal resistance of the sample were measured at a room temperature of 25° C. as a room-temperature reference capacitance and a room-temperature reference internal resistance respectively. Further, a capacitance and an internal resistance at a low temperature of −30° C. were measured as a low-temperature reference capacitance and a low-temperature reference internal resistance, respectively. While the sample was then put in a thermostatic oven having a temperature of 60° C., a voltage of 2.5V was applied to the sample for 1000 hours. Then, the capacitance and internal resistance of the sample were measured at a temperature of −30° C. The ratio of the measured capacitance to the low-temperature reference capacitance, a changing rate of capacitance was −31.7%. The ratio of the measured internal resistance to the low-temperature reference internal resistance, a changing rate of the internal resistance was 1.82 times.

Comparative Example

A sample of a comparative example of an electric double layer capacitor was manufactured similarly to the sample of example 1 except that a separator included only a separation layer made of cellulose and did not include an inhibition layer.

The changing rate of the capacitance of the sample of the comparative example measured under the same condition as example 1 was −33.4%, and the changing rate of the internal resistance was 2.10 times.

As described above, example 1 of electric double layer capacitor 1001 exhibited a less change in the capacitance and the internal resistance than the comparative example, thus having excellent durability.

While the samples of exemplary embodiment 1 and the comparative example are further put in the thermostatic oven having a temperature of 60° C., a voltage of 2.5V was applied to the samples for 1000 hours, that is, for 2000 hours in total. Then, the capacitance and the internal resistance of the samples were measured at a temperature of −30° C. The changing rates of the capacitances, i.e., the ratios of respective measured capacitances of the samples of example 1 and the comparative example to the low-temperature reference capacitances were −44.3% and −45.6%, respectively. The changing rates of the internal resistances, i.e., the ratios of respective measured internal resistances to the low-temperature reference internal resistances were 2.39 times and 2.77 times, respectively. The internal resistances of the samples were measured at a room temperature of 25° C. The changing rates of the internal resistances, i.e., the ratios of respective measured internal resistances of the samples of example 1 and the comparative example to the room-temperature reference internal resistances were 1.54 times and 1.76 times, respectively.

Thus, the sample of example 1 exhibited smaller changes in the capacitance and the internal resistance at low temperatures and the room temperature than the sample of the comparative example did, thus having excellent durability.

Example 2

A sample of example 2 of electric double layer capacitor 1001 includes separator 5 including inhibition layer 5A made of polyethylene-terephthalate and separation layer 5B made of cellulose was manufactured similarly to the sample of example 1.

Just after the sample of example 2 of electric double layer capacitor 1001 was manufactured, a capacitance and an internal resistance at a room temperature of 25° C. were measured as a room-temperature reference capacitance and a room-temperature reference internal resistance, respectively. Further, a capacitance and an internal resistance at a low temperature of −30° C. were measured as a low-temperature reference capacitance and a low-temperature reference internal resistance, respectively. While the sample was put in a thermostatic oven having a temperature of 60° C., a voltage of 2.5V was applied to the sample for 1000 hours. Then, the capacitance and the internal resistance were measured at a temperature of −30° C. The ratio of the measured capacitance to the low-temperature reference capacitance, a changing rate of capacitance was −31.6%. The ratio of the measured internal resistance to the low-temperature reference internal resistance, a changing rate of internal resistance was 1.88 times.

While the sample of example 2 was further put in the thermostatic oven having a temperature of 60° C., a voltage of 2.5V was applied to the sample for 1000 hours, that is, for 2000 hours in total. Then, the capacitance and the internal resistance of the sample were measured at a temperature of −30° C. The ratio of the measured capacitance of the sample of example 2 to the low-temperature reference capacitance, a changing rate of capacitance, was −43.7%. The ratio of the measured internal resistance to the low-temperature reference internal resistance, a changing rate of internal resistance, was 2.35 times. Then, the internal resistance of the sample was measured at a room temperature of 25° C. The ratio of the measured internal resistance of the sample to the room-temperature reference internal resistance, a changing rate of internal resistance was 1.59 times.

Thus, the sample of example 2 exhibited smaller changes in the capacitance and the internal resistance at low temperatures and the room temperature than the sample of the comparative example did, thus having excellent durability.

INDUSTRIAL APPLICABILITY

An electric double layer capacitor according to the present invention prevents a separator from dissolving, hence having excellent long-term reliability. This capacitor is useful for systems, such as vehicles, requiring high reliability to large currents and low temperatures.

The invention claimed is:
1. An electric double layer capacitor comprising:
a first collector having a surface;
a second collector having a surface directed towards the surface of the first collector, wherein a lower electric potential is to be applied to the second collector than to the first collector;
a first polarizable electrode layer provided on the surface of the first collector;
a second polarizable electrode layer provided on the surface of the second collector;
a separator provided between the first polarizable electrode layer and the second polarizable electrode layer, the separator having an insulation property; and
an electrolytic solution impregnated in the separator, the first polarizable electrode layer and the second polarizable electrode layer, the electrolytic solution containing anion including fluorine as electrolyte,
wherein the separator includes
a separation layer containing cellulose, and
an inhibition layer facing the first polarizable electrode layer, the inhibition layer being made of material different from material of the separation layer, the inhibition layer preventing cellulose from decomposing.
2. The electric double layer capacitor according to claim 1, wherein the inhibition layer contacts the first polarizable electrode layer and is made of one of olefin-based polymer, fluorine-based polymer, aramid resin, and polyester-based polymer.
3. The electric double layer capacitor according to claim 1, wherein the first collector is made of metal foil.
4. The electric double layer capacitor according to claim 1, wherein the second collector is made of metal foil.
5. The electric double layer capacitor according to claim 1, wherein the separation layer is made of multiple-layer paper.

6. An electric double layer capacitor comprising:

a first collector having a surface;

a second collector having a surface directed towards the surface of the first collector, the second collector being arranged to have a lower electric potential applied thereto than the first collector;

a first polarizable electrode layer provided on the surface of the first collector;

a second polarizable electrode layer provided on the surface of the second collector;

a separator provided between the first polarizable electrode layer and the second polarizable electrode layer, the separator having an insulation property; and an electrolytic solution impregnated in the separator, the first polarizable electrode layer and the second polarizable electrode layer, the electrolytic solution containing anion including fluorine as electrolyte, wherein the separator includes a separation layer containing cellulose, and an inhibition layer facing the first polarizable electrode layer, the inhibition being made of material different from material of the separation layer, the inhibition layer being made of one of olefin-based polymer, fluorine-based polymer, aramid resin, and polyester-based polymer.

7. A method of manufacturing an electric double layer capacitor, comprising:

providing a first collector having a surface;

providing a second collector having a surface directed towards the surface of the first collector, the second collector layer being arranged to have a lower electric potential applied thereto than the first collector;

providing a first polarizable electrode layer on the surface of the first collector;

providing a second polarizable electrode layer on the surface of the second collector;

providing a separator having an insulating property, the separator including a separation layer containing cellulose, and an inhibition layer placed on the separation layer, the inhibition layer being made of material different from material of the separation layer to prevent cellulose from decomposing;

placing the separator to contact the first polarizable electrode layer and the second polarizable electrode layer, such that the inhibition layer faces the first polarizable electrode layer and the separation layer faces the second polarizable electrode layer; and impregnating the separator, the first polarizable electrode layer, and the second polarizable electrode layer, with a electrolytic solution containing anion including fluorine as electrolyte.

8. The method according to claim 7, wherein the material of the inhibition layer is one of olefin-based polymer, fluorine-based polymer, aramid resin, and polyester-based polymer.

9. The method according to claim 7, wherein said providing of the separator comprises bonding a sheet onto the separation layer, the sheet being made of the material of the inhibition layer.

10. The method according to claim 7, wherein said providing of the separator comprises applying the material of the inhibition layer onto the separation layer.

11. The method according to claim 7, wherein the separation layer is made of multiple-layer paper.

12. The method according to claim 7, wherein said providing of the separator comprises applying solution containing cellulose dispersed therein, and drying the applied solution.

13. The method according to claim 12, wherein said providing of providing the separator further comprises applying the solution onto the applied solution.

* * * * *

UNITED STATES PATENT AND TRADEMARK OFFICE
CERTIFICATE OF CORRECTION

| | | |
|---|---|---|
| PATENT NO. | : 7,885,053 B2 | Page 1 of 1 |
| APPLICATION NO. | : 12/300919 | |
| DATED | : February 8, 2011 | |
| INVENTOR(S) | : Nao Matsumura, Motohiro Sakata and Hideki Shimamoto | |

It is certified that error appears in the above-identified patent and that said Letters Patent is hereby corrected as shown below:

In Column 4, line 36, please delete "6A" and insert therefor --5A--.

In Column 4, line 41, please delete "6A" and insert therefor --5A--.

Signed and Sealed this
Nineteenth Day of July, 2011

David J. Kappos
*Director of the United States Patent and Trademark Office*